United States Patent
Itamoto (10) Patent No.: US 8,649,122 B2
(45) Date of Patent: Feb. 11, 2014

(54) RACK•PINION MECHANISM, AN ACCESSOR, AND A MAGNETIC TAPE APPARATUS

(75) Inventor: Yuichi Itamoto, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 134 days.

(21) Appl. No.: 13/260,299

(22) PCT Filed: Mar. 25, 2010

(86) PCT No.: PCT/JP2010/055228
§ 371 (c)(1),
(2), (4) Date: Sep. 24, 2011

(87) PCT Pub. No.: WO2010/110371
PCT Pub. Date: Sep. 30, 2010

(65) Prior Publication Data
US 2012/0019958 A1    Jan. 26, 2012

(30) Foreign Application Priority Data

Mar. 26, 2009 (JP) .................................. 2009-077538

(51) Int. Cl.
*G11B 15/68* (2006.01)
(52) U.S. Cl.
USPC ........................................................ 360/92.1
(58) Field of Classification Search
USPC ........................................................ 360/92.1
See application file for complete search history.

(56) References Cited

U.S. PATENT DOCUMENTS

| 4,648,725 A | 3/1987 | Takahashi |
| 4,836,494 A | 6/1989 | Johnsen |

(Continued)

FOREIGN PATENT DOCUMENTS

| JP | 60-134957 U | 9/1985 |
| JP | 62-35736 U | 3/1987 |

(Continued)

OTHER PUBLICATIONS

English translation of Japanese Office Action dated May 14, 2013.

(Continued)

*Primary Examiner* — Mark Blouin
(74) *Attorney, Agent, or Firm* — McGinn IP Law Group, PLLC (57) ABSTRACT

A rack•pinion mechanism in which strength of a member to form a rack can be secured and a member including a pinion can be securely moved in a predetermined direction, and an accessor and a magnetic tape apparatus each including the mechanism are provided. For this purpose, in a picker 22, a pair of projections 222a and 222b are formed to sandwich both side surfaces of a pinion 211, the projections 222a and 222b perpendicularly rising toward a base 21 and curving or bending in an intermediate position thereof; in the base 21, a pair of grooves 212a and 212b are formed on both sides of a rack 211 in a shape to engage with the projections 222a and 222b, a section sandwiched by the grooves 212a and 212b is an engage section 213 including the rack 211 in a center of a wide section 213a at a tip end thereof; and by engaging the projections 222a and 222b with the grooves 212a and 212b, the wide section 213a is held between the projections 222a and 222b.

20 Claims, 7 Drawing Sheets

(56) References Cited

U.S. PATENT DOCUMENTS

| | | |
|---|---|---|
| 5,588,418 A | 12/1996 | Holmes et al. |
| 5,893,669 A * | 4/1999 | Sugai et al. .................. 400/223 |
| 6,157,513 A | 12/2000 | Coffin et al. |
| 6,301,072 B1 | 10/2001 | Coffin et al. |
| 6,839,198 B2 | 1/2005 | Shimanuki |
| 6,909,580 B2 * | 6/2005 | Kurosawa .................... 360/133 |
| 7,894,157 B2 * | 2/2011 | Green et al. ................. 360/92.1 |
| 8,102,617 B2 * | 1/2012 | Thorn et al. ................. 360/92.1 |
| 2003/0095355 A1 | 5/2003 | Shimanuki |
| 2008/0318645 A1 | 12/2008 | Takamori et al. |
| 2009/0033024 A1 | 2/2009 | Shiohara et al. |
| 2010/0097718 A1 * | 4/2010 | Wada et al. ................. 360/92.1 |

FOREIGN PATENT DOCUMENTS

| | | |
|---|---|---|
| JP | 62-56616 A | 3/1987 |
| JP | 64-27574 U | 2/1989 |
| JP | 5-144146 A | 6/1993 |
| JP | 5-86135 U | 11/1993 |
| JP | 2000-215578 A | 8/2000 |
| JP | 2002-245764 A | 8/2002 |
| JP | 2003-0042154 | 2/2003 |
| JP | 2003-157599 A | 5/2003 |
| JP | 2007-092871 A | 4/2007 |
| JP | 2008-78172 A | 4/2008 |
| JP | 2008-258995 A | 10/2008 |
| JP | 2009-51665 A | 3/2009 |
| WO | WO 2006/046544 A1 | 5/2006 |

OTHER PUBLICATIONS

European Search Report dated Aug. 2, 2013.

* cited by examiner

RACK·PINION MECHANISM, AN ACCESSOR, AND A MAGNETIC TAPE APPARATUS

TECHNICAL FIELD

The present invention relates to a mechanism to relatively and linearly move two members by a rack and a pinion, and in particular, to a rack·pinion mechanism which securely engages a rack with a pinion to prevent occurrence of yaw, and an accessor and a magnetic apparatus each including the mechanism.

RELATED ART

In a magnetic tape apparatus, as a mechanism to move a picker to draw a cartridge tape into an accessor, there exists structure adopting a mechanism in which a rack and a pinion are combined with each other (to be referred to as a rack·pinion mechanism hereinbelow). An accessor employing a rack·pinion mechanism has been disclosed in Patent Document 1.

Figure 1:
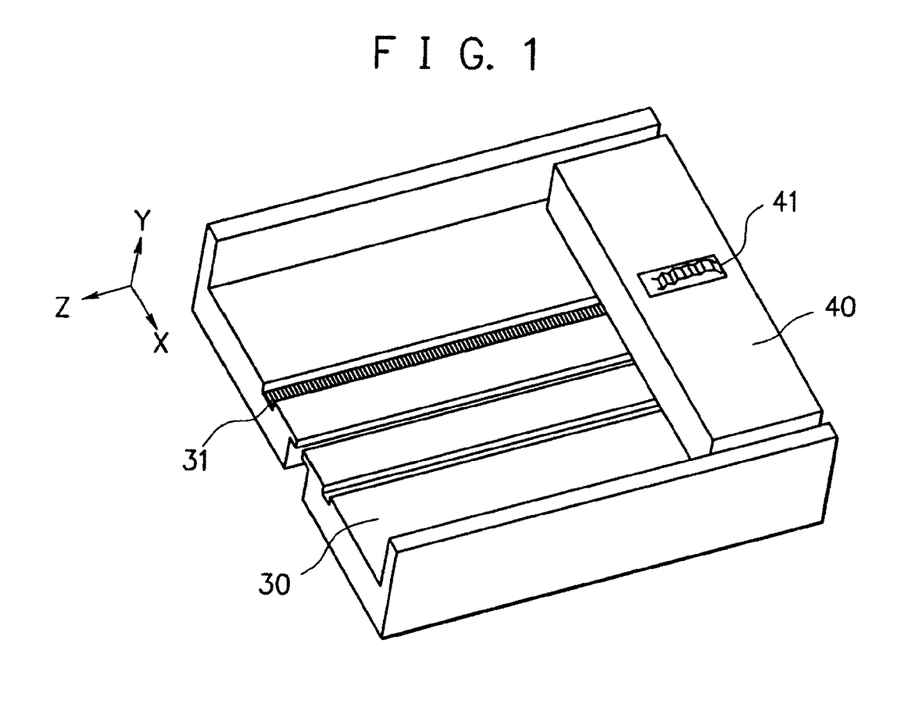
FIG. 1 is a diagram showing structure of an accessor in which a picker is moved by a rack•pinion mechanism.
Figure 2:
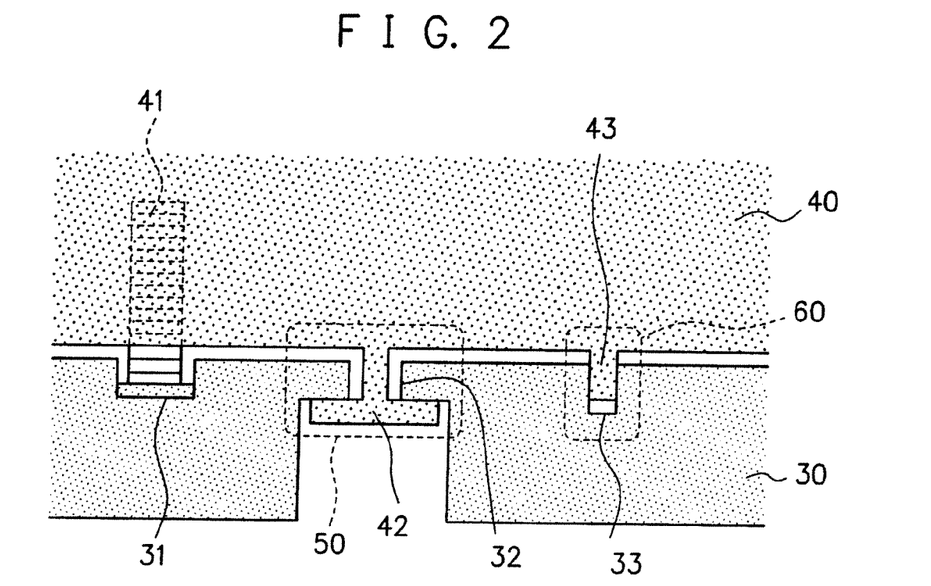
FIG. 2 is a diagram showing a configuration of a rack•pinion mechanism.

FIG. 1 shows a configuration of an accessor to move a picker by a rack·pinion mechanism as disclosed in Patent Document 1. Additionally, FIG. 2 shows an enlarged image of the rack·pinion mechanism.

A rack 31 is formed in a bottom surface section of a base 30; in a picker 40, a pinion 41 is arranged to substantially perpendicularly oppose the bottom surface of the base 30. By turning the pinion 41 by a driving source, not shown, the pinion 41 rotates by engaging with the rack 31 and the picker 40 travels in an extending direction (Z direction) of the rack 31.

In such configuration, if the rack 31 does not appropriately engage with the pinion 41, there appear no force to drive the picker 40; hence, it is required to prevent the picker 40 from moving upward from the base 30 (moving in a Y direction). For this purpose, there is disposed a gear pitch holding section 50 including a groove 32 disposed in the base 30 in an extending direction of the rack 31 and a projection 42 disposed in the picker 40 having substantially a T shape when viewed from a side surface, to thereby prevent the upward movement of the picker 40.

Also, the pinion 41 is arranged, in consideration of a problem of layout, not in a center of the picker 40, but one-sided on a right or left region thereof in many cases. If the pinion 41 is disposed in substantially a central region of the picker 40, yaw (turning force about the Y axis) little occurs when the pinion 41 is driven; however, if the pinion 41 is arranged in a region other than the central region, the pinion 41 engages with the rack 31 in a state in which the pinion 41 is skewed with respect to the rack 31; hence, yaw easily acts upon the picker 40. Therefore, to cause the picker 40 to conduct reciprocal movement along the rack 31 by suppressing occurrence of yaw, there is required structure to guide the picker 40. For this purpose, there is disposed a guide structure section 60 including a depression 33 disposed in the base 30 in an extending direction of the rack 31 and a projection 43 disposed in the picker 40, to thereby urge the picker 40 to conduct reciprocal movement along the rack 31.

Figure 3:
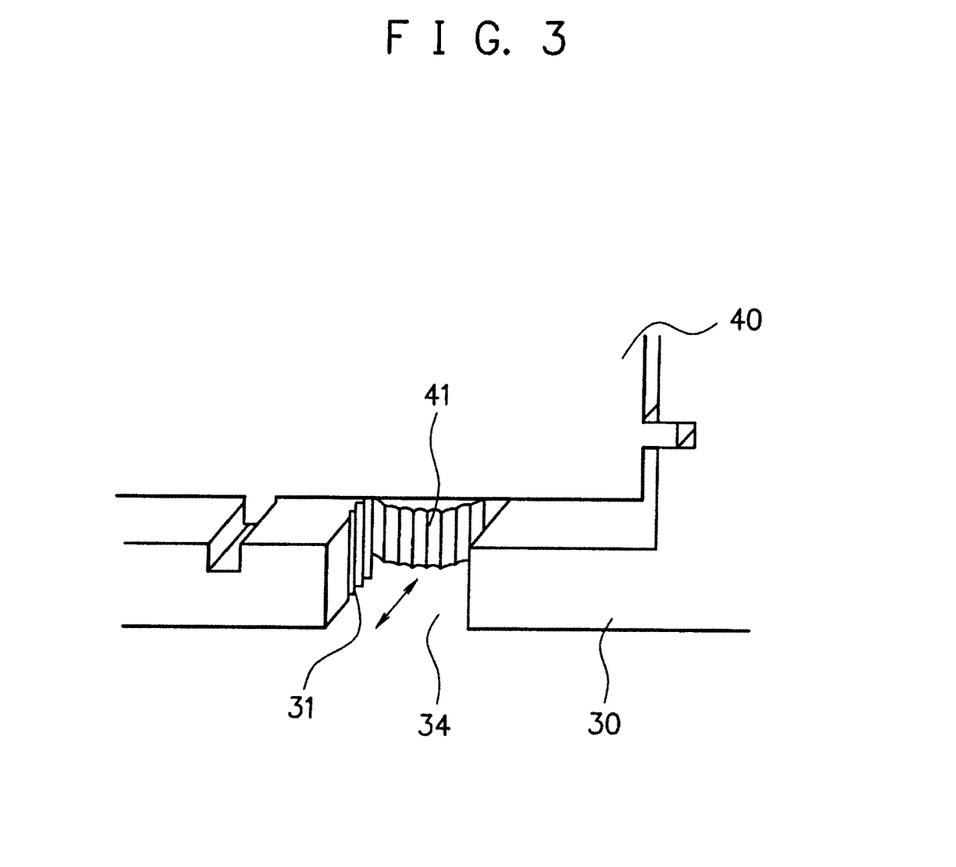
FIG. 3 is a diagram showing structure of an accessor to which the invention disclosed in Patent Document 2 is applied.

In addition, another configuration of the rack·pinion mechanism has been disclosed in Patent Document 2. When the invention disclosed in Patent Document 2 is applied to an accessor, there is implemented a configuration in which the pinion 41 is installed to rotate in parallel with the bottom surface of the base 30 as shown in FIG. 3.

PRIOR ART REFERENCE

Patent Document

Patent Document 1: Japanese Patent Laid-Open Publication. No. 2003-157599
Patent Document 2: Japanese Patent Laid-Open Publication. No. 2008-258995

SUMMARY OF THE INVENTION

Problems to be Solved by the Invention

In the accessor of the conventional structure, the projection 42 on the side of the picker 40 in the gear pitch holding section 50 has a T shape when viewed from a side surface. The projection 42 on the picker 40 side is slender in its root section; hence, when molding the base 30, it is difficult to form the groove 32 by sliding and thereby drawing a metal mold, the metal mold having a contour substantially equal to that of the projection on the picker side as shown in FIG. 4(*a*).

When the projection 42 on the picker 40 side is made fat so that the groove is formed by sliding the metal mold, the distance in the X direction between the pinion 41 and the guide structure section 60 becomes larger. The yaw occurring at rotation of the pinion 61 acts upon the picker 41 by using, as a fulcrum, a contact section between the projection 43 on the picker 40 side and the depression 33 on the base 30 side in the guide structure section 60; hence, when the distance in the X direction from the pinion 41 to the guide structure section 60 becomes larger, the yaw is stronger and the reciprocation of the accessor is possibly disturbed.

Figure 4:
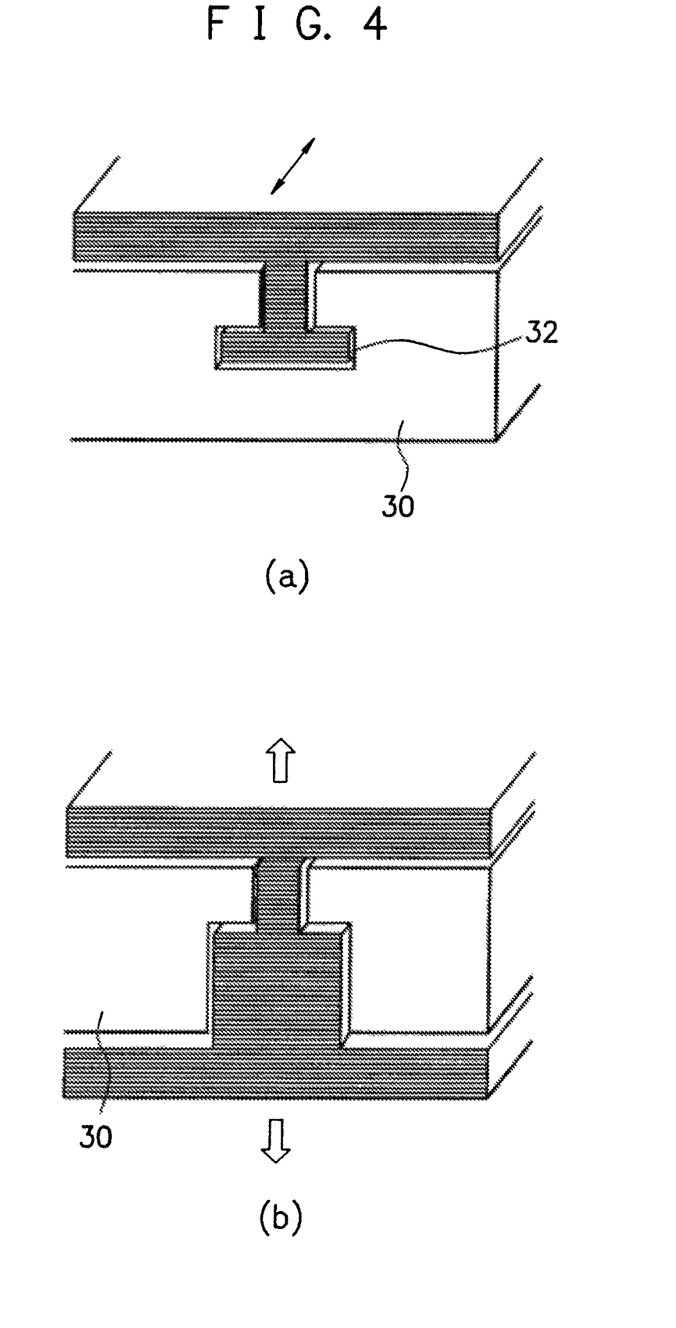
FIG. 4 is a diagram showing a configuration of a metal mold to form a groove in a base.

Therefore, as FIG. 4(*b*) shows, the metal mold is required to be configured such that another metal mold part is placed on a rear surface of the base 30, and after the molding, the metal mold part is made apart to be drawn therefrom; actually, the groove 32 of the base 30 has no bottom, namely, becomes a slit; hence, the base 30 is lowered in strength.

This likewise applies to a case in which the invention disclosed in Patent Document 2 is applied to an accessor; since it is required to arrange the groove or slit 34 to serve as a path of the pinion 41 as shown in FIG. 3, there also arises a problem of reduction in strength of the base 30.

The present invention has been devised in consideration of the problem and has an object to provide a rack·pinion mechanism in which strength of a member to form a rack is secured and a member including a pinion can be securely moved in a predetermined direction, and an accessor and a magnetic tape apparatus each including the mechanism.

Means for Solving to the Problems

To achieve the object, as a first mode of the present invention, there is provided a rack·pinion mechanism comprising a first block including a rack and a second block including a pinion in which teeth are disposed to oppose the first block to engage with the rack, the first and second blocks relatively conducting linear movement in association with rotation of the pinion, characterized in that in the second block, a pair of projections are formed to sandwich both side surfaces of the pinion, the projections perpendicularly rising toward the first block and curving or bending in an intermediate position thereof; in the first block, a pair of grooves are formed on both sides of the rack in a shape to engage with the pair of projections, and a section sandwiched by the pair of grooves is an engage section including the rack in a center of a wide section at a tip end thereof; and by engaging the pair of projections with the grooves, the wide section at the tip end of the engage section is held between the pair of projections.

Additionally, in order to achieve the object, there is provided as a second mode of the present invention an accessor comprising a rack•pinion mechanism in accordance with the first mode of the present invention, characterized in that the second block is a base to hold a cartridge tape and the first block is a picker to draw the cartridge tape into the base.

In addition, to achieve the object, there is provided as a third mode of the present invention a magnetic tape apparatus comprising an accessor in accordance with the second mode of the present invention, characterized in that the magnetic tape apparatus draws a cartridge tape stored in an array vertical to a moving direction of the picker, by the picker into the base and holds the cartridge tape therein and moves the accessor along the array direction of the cartridge tape, to thereby transport the cartridge tape held in the base to a drive which conducts data reading and writing operations.

Advantages of the Invention

In accordance with the present invention, there are provided a rack•pinion mechanism in which strength of a member to form a rack is secured and a member including a pinion can be securely moved in a predetermined direction, and an accessor and a magnetic tape apparatus each including the mechanism.

BEST MODE FOR CARRYING OUT THE EMBODIMENTS

First Embodiment

Description will be given of a first embodiment in which the present invention is appropriately implemented.

Figure 5:
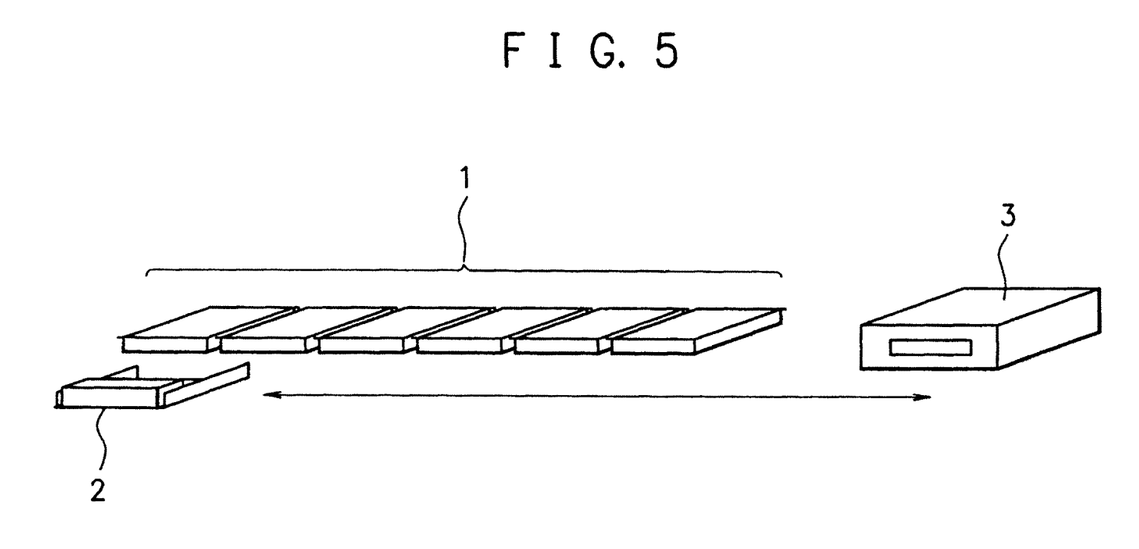
FIG. 5 is a diagram showing structure of the inside of a magnetic tape apparatus according to a first embodiment in which the present invention is appropriately implemented.

FIG. 5 shows structure of the inside of a magnetic tape apparatus according to the present embodiment. In the magnetic tape apparatus, a plurality of cartridge tapes 1 are stored and an accessor 2 movable in an arranging direction of the cartridge tapes 1 are disposed. The accessor engages a hook, not shown, with an arbitrary cartridge tape 1 to take out the cartridge tape 1 from its storage position and transports the cartridge tape to a drive 3. The cartridge tape 1 transported to the drive 3 is inserted into the drive 3. And then data writing•reading operation is carried out thereon.

Figure 6:
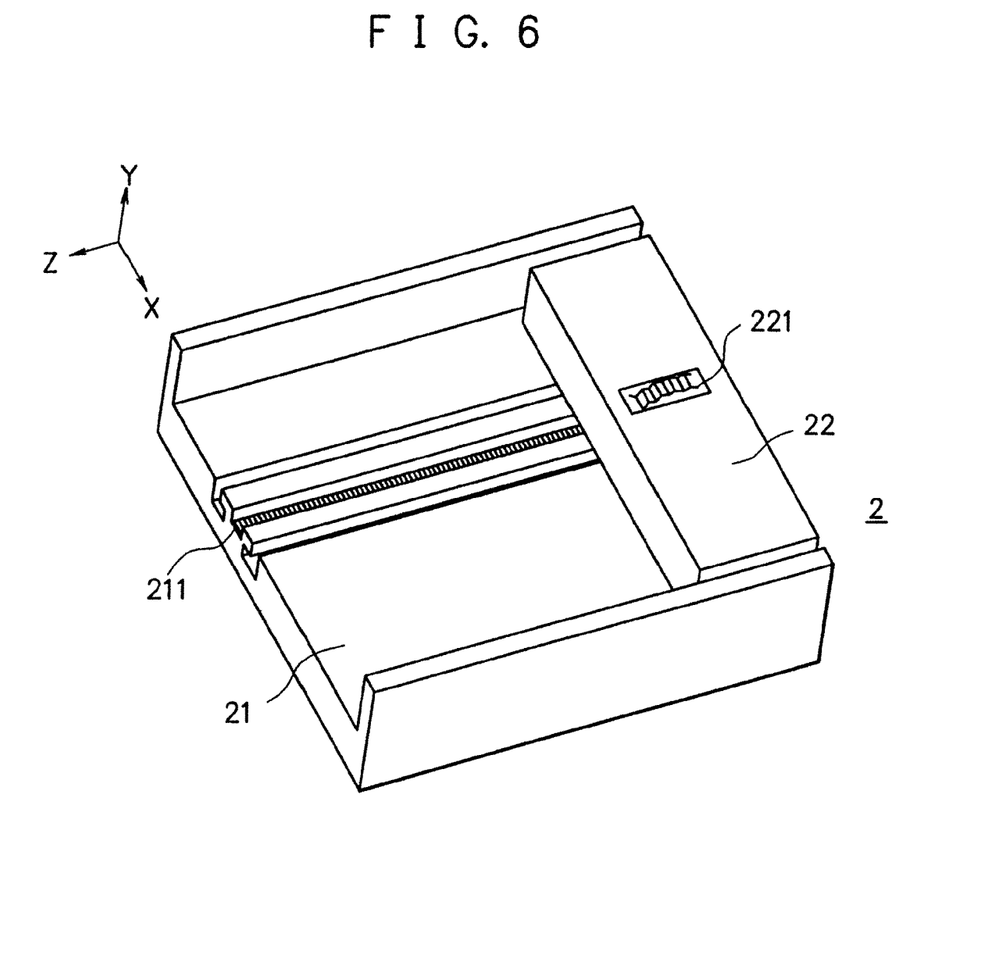
FIG. 6 is a diagram showing a configuration of an outline of an accessor according to the first embodiment.

FIG. 6 shows a configuration of an outline of the accessor 2 according to the present embodiment. The accessor 2 includes a base 21 to hold a cartridge tape 1 and a picker 22 to draw the cartridge tape 1. The accessor 2 includes a rack•pinion mechanism including a rack 211 formed in the base 21 and a pinion 221 disposed in the picker 22, and the picker 22 is reciprocally movable in the Z direction.

Figure 7:
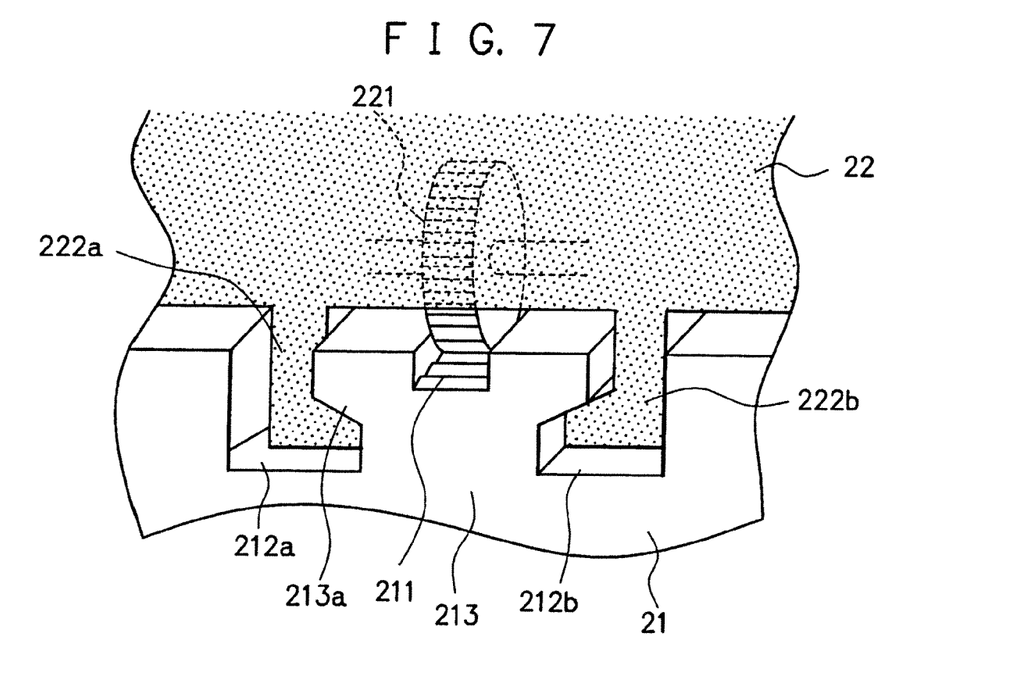
FIG. 7 is a diagram showing structure of a rack•pinion mechanism.

FIG. 7 shows structure of the rack•pinion mechanism. In the base 21, there is formed the rack 211; on both sides thereof, a pair of grooves 212a and 212b are formed. Each of the grooves 212a and 212b is bent toward other one thereof in the bottom surface section thereof, and has substantially an L shape when viewed in a cross section. Hence, an engage section 213 sandwiched by the paired grooves 212a and 212b has substantially a T shape when viewed in a cross section, the engage section 213 including a wide section 213a at a tip end thereof, and the rack 211 is arranged in the center of the wide section 213a in this configuration.

In the picker 22, the pinion 221 is arranged to substantially perpendicularly face the base 21; on both sides of the pinion 221, a pair of projections 222a and 222b are formed with a gap therebetween, the gap being substantially equal to the gap between the paired grooves 212a and 212b in the base 21. Each of the tip ends of the projections 222a and 222b is bent toward other one thereof, and has substantially an L shape when viewed in a cross section. The gap between the root sections of the projections 222a and 222b is almost equal to the width of the wide section 213a of the engage section 213 in the base 21.

As FIG. 7 shows, when the paired projections 222a and 222b of the picker 22 are inserted in the paired grooves 212a and 212b of the base 21, there is implemented a state in which the engage section 213 of the base 21 is arranged between the paired projections 222a and 222b of the picker 22.

Since the wide section 213a of the engage section 213 in the base 21 overlaps with the tip ends of the projections 222a and 222b of the picker 22 in the Y direction, it is prevented that the picker 22 moves upward from the base 21.

In addition, the yaw at rotation of the pinion 221 acts upon the picker 22 by using, as a fulcrum, the point of contact between the wide section 213a of the engage section 213 in the base 21 and the root sections of the paired projections 222a and 222b of the picker 22; however, since the distance between the pinion 221 and the fulcrum is small, the yaw acting upon the picker 22 is reduced.

Figure 8:
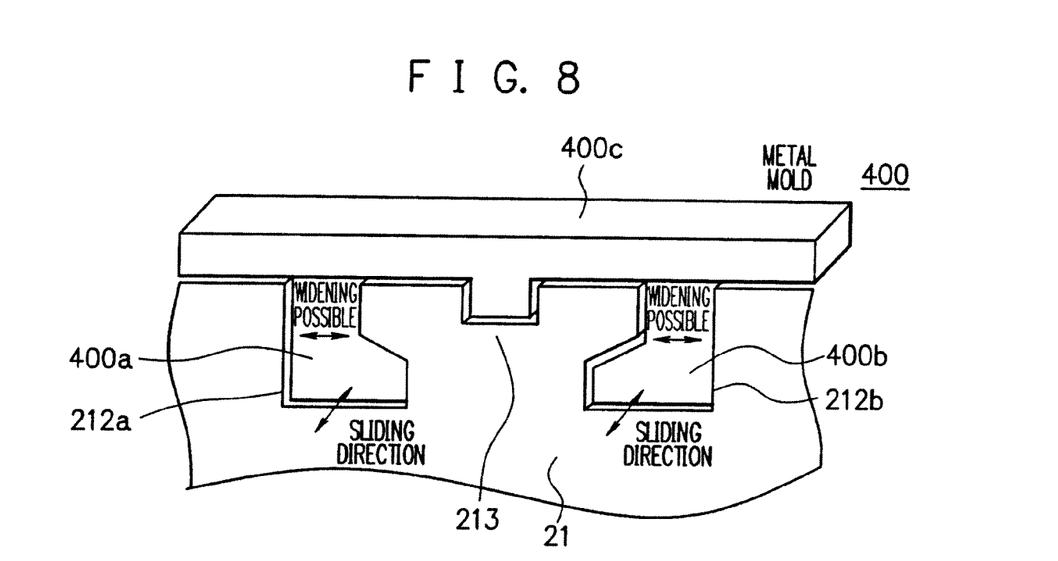
FIG. 8 is a diagram showing a configuration of a metal mold to form a pair of grooves in a base.

FIG. 8 shows a configuration of a metal mold 400 to form the paired grooves 212a and 212b in the base 21. The metal mold 400 has a configuration which can be subdivided into metal mold parts 400a, 400b, and 400c as shown in FIG. 8. Even when L-shaped sections of the metal mold parts 400a and 400b are made fatter, the contact point between the wide section 213a of the engage section 213 in the base 21 and the root sections of the paired projections 222a and 222b of the picker 22 does not move to be apart from the pinion 221. Hence, it is possible to adopt a configuration to form the grooves 212a and 212b by sliding the metal mold parts 400a and 400b.

As above, in the accessor in accordance with the present embodiment, it is not required to form a slit (long hole) in the base; hence, the strength of the base and precision of parts can be improved.

Second Embodiment

Figure 9:
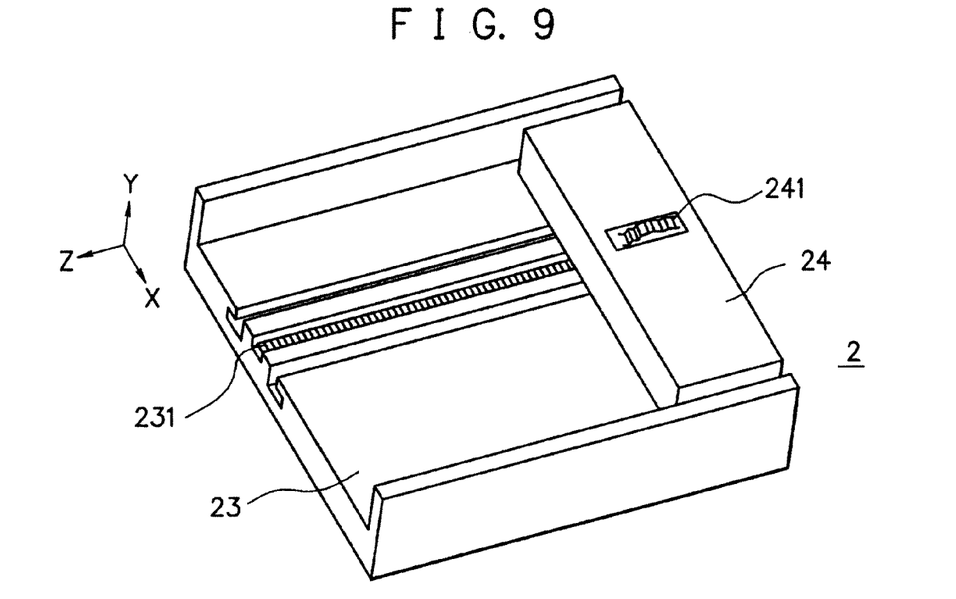
FIG. 9 is a diagram showing a configuration of an outline of an accessor according to a second embodiment in which the present invention is appropriately implemented.

Description will be given of a second embodiment in which the present invention is appropriately implemented. FIG. 9 shows a configuration of an outline of the accessor according to the present embodiment. The accessor 2 of the present embodiment includes, like the first embodiment, a base 23 to hold a cartridge tape 1 and a picker 24 to draw the cartridge tape 1, and includes a rack•pinion mechanism including a rack 231 formed in the base 23 and a pinion 241 formed in the picker 24, and the picker 24 is reciprocally movable in the Z direction.

Figure 10:
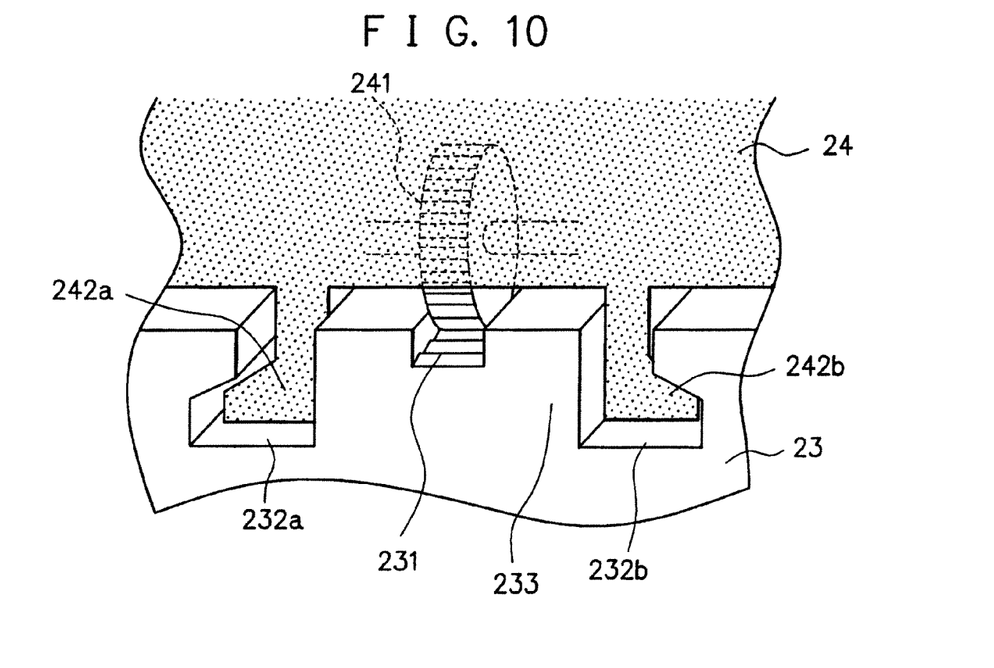
FIG. 10 is a diagram showing structure of a rack•pinion mechanism.

FIG. 10 shows structure of the rack•pinion mechanism. In the base 23, there is formed the rack 231; on both sides thereof, a pair of grooves 232a and 232b are formed. Each of the grooves 232a and 232b is bent, in the bottom surface section thereof, toward a side reverse to the side toward which other one of the grooves is bent, and each of the grooves has substantially an L shape when viewed in a cross section. Hence, the rack 231 is disposed in a center of an engage section 233 sandwiched by the paired grooves 232a and 232b in the configuration.

In the picker 24, the pinion 241 is arranged to substantially perpendicularly face the base 23; on both sides of the pinion 241, a pair of projections 242a and 242b are formed with a gap therebetween, the gap being substantially equal to the gap between the paired grooves 232a and 232b in the base 23. Each of the tip ends of the projections 242a and 242b is bent toward a side reverse to the side toward which other one of the tip ends is bent, and each thereof has substantially an L shape when viewed in a cross section. The gap between the root sections of the projections 242a and 242b is almost equal to the width of the engage section 233 in the base 23.

As FIG. 10 shows, when the paired projections 242a and 242b of the picker 24 are inserted in the paired grooves 232a and 232b of the base 23, there is implemented a state in which the engage section 233 of the base 23 is arranged between the paired projections 242a and 242b of the picker 24.

Since the inlet sections of the grooves 232a and 232b in the base 23 overlap with the tip ends of the projections 242a and 242b of the picker 24 in the Y direction, it is prevented that the picker 24 moves upward from the base 23.

In addition, the yaw at rotation of the pinion 242 acts upon the picker 24 by using, as a fulcrum, the point of contact between the inlet sections of the grooves 232a and 232b in the base 23 and the root sections of the paired projections 242a and 242b of the picker 24; however, since the distance between the pinion 241 and the fulcrum is small, the yaw acting upon the picker 24 is reduced.

In the metal mold to form the paired grooves 232a and 232b in the base 23 of the present embodiment, the metal mold parts are bent in the direction reverse to that of the metal mold parts 400a and 400b of the first embodiment; however, similarly, even when the L-shaped sections of the metal mold parts to form the grooves 232a and 232b are made fatter, the contact point between the inlet sections of the grooves 232a and 232b of the base 23 and the root sections of the paired projections 242a and 242b of the picker 24 does not move to be apart from the pinion 241. Hence, for the metal mold, it is possible to adopt a configuration to form the grooves 232a and 232b by sliding the metal mold parts.

As above, in the accessor in accordance with the present embodiment, it is not required to form a slit (long hole) in the base; hence, the strength of the base and precision of parts can be improved.

In this regard, each embodiment described above is an appropriate example of embodying the present invention, and the present invention is not restricted by the embodiment.

For example, in the description of each embodiment above, an accessor of a magnetic tape apparatus is employed as an example; however, naturally, the rack•pinion mechanism in accordance with the present invention is also applicable to any other apparatus.

In this way, various variations are possible for the present invention.

This application is based upon and claims the benefit of priority from Japanese patent application No. 2009-077538, filed on Mar. 26, 2009, the disclosure of which is incorporated herein its entirety by reference.

DESCRIPTION OF REFERENCE NUMERALS

1 Cartridge tape
2 Accessor
3 Drive
21, 23 Base
22, 24 Picker
211, 231 Rack
212a, 212b, 232a, 232b Groove
213 Engage section
213a Wide section
221, 241 Pinion
222a, 222b, 242a, 242b Projection
400 Metal mold
400a, 400b, 400c Metal mold part

The invention claimed is:

1. A rack-and-pinion mechanism comprising a first block including a rack and a second block including a pinion in which teeth are disposed to oppose the first block to engage with the rack, the first and second blocks relatively conducting linear movement in association with rotation of the pinion, wherein:
   in the second block, a pair of projections are formed to sandwich axially side surfaces of the pinion, the projections perpendicularly rising toward the first block and curving or bending in an intermediate position thereof;
   in the first block, a pair of grooves are formed on sides of the rack in a shape to engage with the pair of projections, the pair of grooves extending parallel to the rack, and a section sandwiched by the pair of grooves comprises an engage section including the rack in a center of a wide section at a tip end thereof; and
   by engaging the pair of projections with the grooves, the wide section at the tip end of the engage section is held between the pair of projections.

2. A rack-and-pinion mechanism in accordance with claim 1, wherein the pair of projections are respectively curved or bent such that each of the tip ends of the projections faces a projection side of another one of the projections.

3. A rack-and-pinion mechanism in accordance with claim 1, wherein the pair of projections are respectively curved or bent such that each of the tip ends of the projections faces a side opposite to a side which other one of the projections faces.

4. A rack-and-pinion mechanism in accordance with claim 1, wherein in the pair of projections, a tip end side thereof has a tapered contour as compared with a curved or bent section thereof.

5. An accessor comprising a rack-and-pinion mechanism in accordance with claim 1, wherein:
   the second block comprises a base to hold a cartridge tape; and
   the first block comprises a picker to draw the cartridge tape into the base.

6. A magnetic tape apparatus comprising an accessor in accordance with claim 5, wherein:

the magnetic tape apparatus draws a cartridge tape stored in an array vertical to a moving direction of the picker, by the picker into the base and holds the cartridge tape therein and moves the accessor along an array direction of the cartridge tape, to thereby transport the cartridge tape held in the base to a drive which conducts one or more of data reading and data writing operations.

7. The rack-and-pinion mechanism in accordance with claim 1, wherein said grooves formed on sides of the rack are formed outside the rack.

8. The rack-and-pinion mechanism in accordance with claim 1, wherein said grooves comprise substantially an L shape when viewed in a cross section.

9. The rack-and-pinion mechanism in accordance with claim 1, wherein said engage section comprises substantially a T shape when viewed in a cross section.

10. The rack-and-pinion mechanism in accordance with claim 1, wherein a gap amount between said grooves is substantially equal to a gap amount between said projections.

11. A rack-and-pinion mechanism, comprising:
a rack formed in a first surface;
a pinion formed in a second surface;
a groove formed on a side of said rack; and
a projection formed on a side of said pinion,
wherein said groove surrounds said projection, preventing a vertical movement of said second surface.

12. The rack-and-pinion mechanism according to claim 11, wherein at least one of said projection and said groove includes a bent portion.

13. The rack-and-pinion mechanism according to claim 11, further comprising:
another groove formed on an opposite side of said rack; and
another projection formed on an opposite side of said pinion,
wherein said another groove surrounds said another projection.

14. The rack-and-pinion mechanism according to claim 11, wherein at least one of said projection and said groove comprises substantially an L shape.

15. The rack-and-pinion mechanism according to claim 11, wherein said vertical movement of said second surface is prevented with respect to the first surface.

16. The rack-and-pinion mechanism according to claim 11, wherein said second surface comprises a picker.

17. The rack-and-pinion mechanism according to claim 16, wherein said first surface comprises a base.

18. The rack-and-pinion mechanism according to claim 11, wherein said groove extends parallel to said rack.

19. The rack-and-pinion mechanism according to claim 13, wherein said groove and said another groove extend parallel to said rack.

20. The rack-and-pinion mechanism according to claim 13, wherein said groove and said another groove are formed in a shape to engage with said projection and said another projection, respectively.

* * * * *